US012119589B2

(12) United States Patent
Fukuda et al.

(10) Patent No.: US 12,119,589 B2
(45) Date of Patent: Oct. 15, 2024

(54) SENSOR UNIT (71) Applicant: KABUSHIKI KAISHA TOKAI RIKA DENKI SEISAKUSHO, Aichi (JP)

(72) Inventors: Kenji Fukuda, Aichi (JP); Yuta Yamanishi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 338 days.

(21) Appl. No.: 17/606,195

(22) PCT Filed: Jun. 10, 2020

(86) PCT No.: PCT/JP2020/022894
§ 371 (c)(1),
(2) Date: Oct. 25, 2021

(87) PCT Pub. No.: WO2020/255833
PCT Pub. Date: Dec. 24, 2020

(65) Prior Publication Data
US 2022/0247126 A1 Aug. 4, 2022

(30) Foreign Application Priority Data

Jun. 21, 2019 (JP) .................................. 2019-115403

(51) Int. Cl.
*H01R 13/631* (2006.01)
*B60R 25/0215* (2013.01)
(Continued)

(52) U.S. Cl.
CPC ..... *H01R 13/6315* (2013.01); *B60R 25/0215* (2013.01); *B62D 1/16* (2013.01);
(Continued)

(58) Field of Classification Search
CPC .............. H01R 13/6315; H01R 12/712; H01R 2201/20; H01R 12/91; B60R 25/0215;
(Continued)

(56) References Cited

U.S. PATENT DOCUMENTS

2007/0062302 A1* 3/2007 Khoury ................ G01D 5/2497
73/780
2015/0375787 A1* 12/2015 Adachi ................ B62D 15/022
464/23

(Continued)

FOREIGN PATENT DOCUMENTS

AU          1244600 A      8/2000
CN       103879374 A      6/2014
(Continued)

OTHER PUBLICATIONS

Reconsideration Report from Japan Patent Office (JPO) in Japanese Patent Appl. No. 2019-115403, dated May 19, 2023, together with an English language translation.
(Continued)

*Primary Examiner* — Michael C Zarroli
(74) *Attorney, Agent, or Firm* — GREENBLUM & BERNSTEIN, P.L.C.

(57) ABSTRACT

A signal output part of a first sensor configured to output a signal corresponding to an operation state of a mechanism for locking rotation of a steering shaft is mounted on a first circuit board. A signal output part of a second sensor configured to output a signal corresponding to an operation state of a mechanism for detecting a rotation angle of the steering shaft is mounted on a second circuit board. A connector electrically connects the first circuit board and the second circuit board while allowing relative displacement therebetween.

10 Claims, 7 Drawing Sheets

(51) Int. Cl.
*B62D 1/16* (2006.01)
*B62D 15/02* (2006.01)
*G01B 7/30* (2006.01)
*G01D 5/14* (2006.01)
*H01R 12/71* (2011.01)

(52) U.S. Cl.
CPC ........... *B62D 15/0215* (2013.01); *G01B 7/30* (2013.01); *G01D 5/145* (2013.01); *H01R 12/712* (2013.01); *H01R 2201/20* (2013.01)

(58) Field of Classification Search
CPC ........ B62D 1/16; B62D 15/0215; G01B 7/30; G01D 5/145; G01D 5/04
See application file for complete search history.

(56) References Cited

U.S. PATENT DOCUMENTS

| | | |
|---|---|---|
| 2017/0117666 A1 | 4/2017 | Maki et al. |
| 2018/0248451 A1 | 8/2018 | Hagiwara |
| 2019/0016300 A1 | 1/2019 | Schlegel et al. |
| 2019/0107184 A1 | 4/2019 | Matsuto et al. |

FOREIGN PATENT DOCUMENTS

| | | |
|---|---|---|
| CN | 104848780 A | 8/2015 |
| CN | 106104942 A | 11/2016 |
| CN | 107078426 A | 8/2017 |
| CN | 107925315 A | 4/2018 |
| CN | 108781021 A | 11/2018 |
| EP | 1 024 055 A1 | 8/2000 |
| JP | 2000-211440 A | 8/2000 |
| JP | 2004-314833 A | 11/2004 |
| JP | 2011-218947 A | 11/2011 |
| JP | 2014-223889 | 12/2014 |
| JP | 2017-163682 A | 9/2017 |
| JP | 2018-016204 A | 2/2018 |

OTHER PUBLICATIONS

International Search Report (including English Language Translation), mailed Aug. 4, 2020 by the Japan Patent Office, in International Application No. PCT/JP2020/022894.

* cited by examiner

SENSOR UNIT

FIELD

The presently disclosed subject matter relates to a sensor unit configured to be coupled to a steering shaft for use in steering a mobile entity.

BACKGROUND

Japanese Patent Publication No. 2000-211440A discloses a configuration in which a steering lock mechanism and a steering angle sensor are coupled to a steering shaft. Japanese Patent Publication No. 2011-218947A discloses a sensor for detecting an operation state of a steering lock mechanism. In order to reduce the number of components and to reduce the size of the structure, there is a demand to arrange two sensors associated with different objects to be detected as close as possible.

SUMMARY

Technical Problem

It is demanded to suppress degradation in the detection accuracy of each sensor while satisfying the demand to dispose two sensors associated with different objects to be detected as close as possible.

Solution to Problem

In order to meet the demand described above, an illustrative aspect of the presently disclosed subject matter provides a sensor unit configured to be coupled to a steering shaft for use in steering a mobile entity, comprising:
  a first circuit board on which a signal output part of a first sensor configured to output a signal corresponding to an operation state of a mechanism for locking rotation of the steering shaft;
  a second circuit board on which a signal output part of a second sensor configured to output a signal corresponding to an operation state of a mechanism for detecting a rotation angle of the steering shaft; and
  a connector electrically connecting the first circuit board and the second circuit board while allowing relative displacement therebetween.

As described above, there is a demand to arrange the first sensor for detecting the operation state of the mechanism for locking the rotation of the steering shaft and the second sensor for detecting the operation state of the mechanism for detecting the rotation angle of the steering shaft S as close as possible. As one of measures for meeting such a demand, it is conceivable that the signal output part of the second sensor is also mounted on the first circuit board. However, since the position of the first circuit board is determined based on the positional relationship between the mechanism for locking the rotation of the steering shaft and the first sensor, there may be a case where the positional relationship between the mechanism for detecting the rotation of the steering shaft and the second sensor cannot be optimized. In other words, the detection accuracy of the second sensor may be degraded.

According to the configuration as described above, the arrangement of the first circuit board is determined so as to optimize the positional relationship between the mechanism for locking the rotation of the steering shaft and the first sensor. On the other hand, the arrangement of the second circuit board may be determined independently of the first circuit board so as to optimize the positional relationship between the mechanism for detecting the rotation of the steering shaft and the second sensor. When the positions of the first circuit board and the second circuit board are individually determined, the positional relationship therebetween may be different from each other for each sensor unit. However, the difference is absorbed by the connector electrically connecting the first circuit board and the second circuit board while allowing the relative displacement therebetween. Accordingly, while suppressing degradation in the detection accuracy of the first sensor and degradation in the detection accuracy of the second sensor, it is possible to arrange the first sensor and the second sensor with a short distance to such an extent that the first circuit board and the second circuit board share a part of the electrical configuration of the sensor unit through the connector.

DESCRIPTION OF EMBODIMENTS

Examples of embodiments will be described in detail below with reference to the accompanying drawings.

Figure 1:
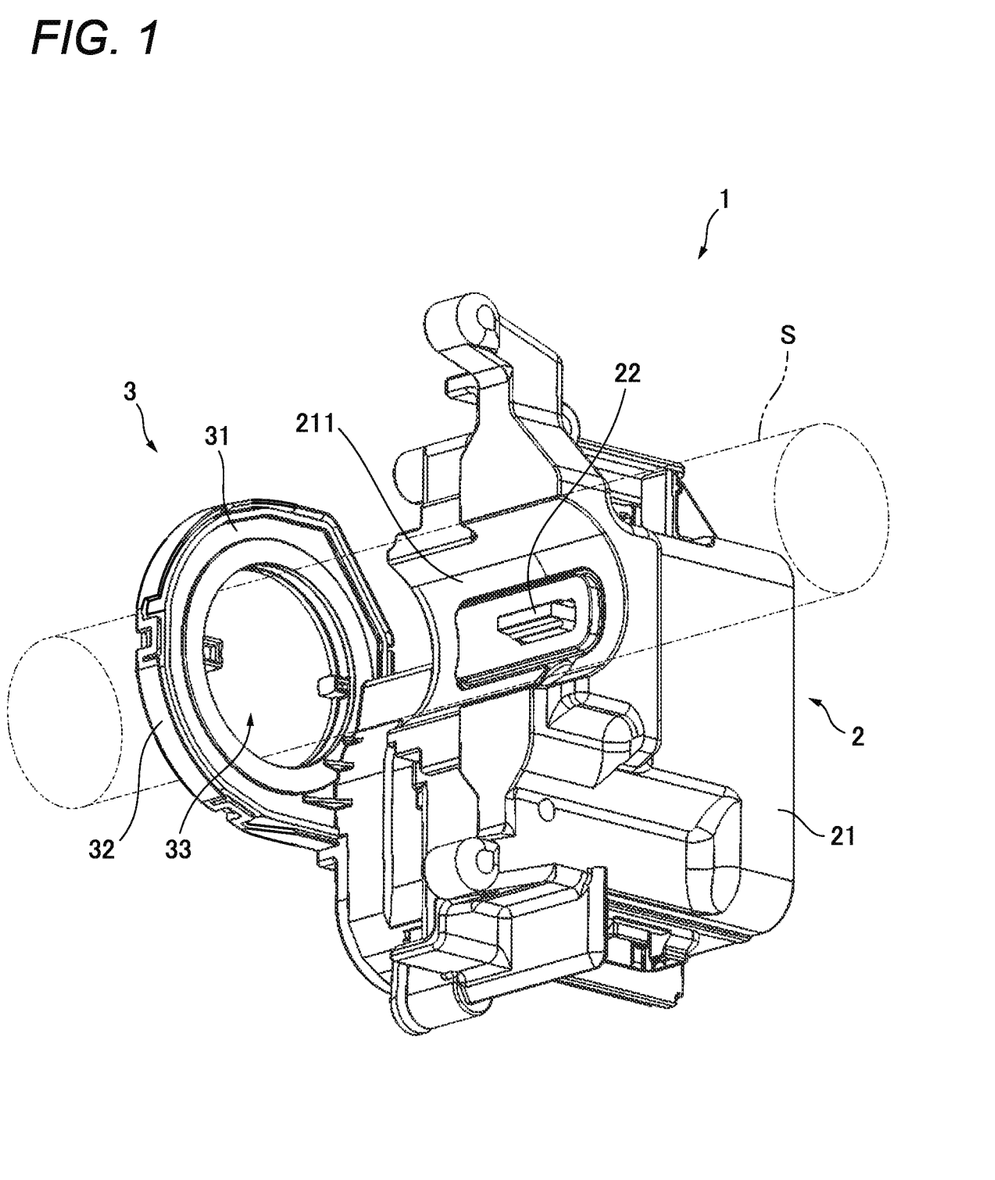
FIG. 1 illustrates an appearance of a sensor unit according to an embodiment.

FIG. 1 illustrates an appearance of a sensor unit 1 according to an embodiment. The sensor unit 1 is configured to be coupled to a steering shaft S for use in steering a mobile entity. Examples of the mobile entity include a vehicle, a railway, a ship, and an aircraft.

The sensor unit 1 includes a lock sensor unit 2 and an angle sensor unit 3. The lock sensor unit 2 detects an operation state of a mechanism for locking the rotation of the steering shaft S. The angle sensor unit 3 detects the rotation angle of the steering shaft S.

The lock sensor unit 2 includes a housing 21. The housing 21 has a curved face 211 opposing the outer circumferential face of the steering shaft S.

The angle sensor unit 3 includes a first housing 31 and a second housing 32. The first housing 31 and the second housing 32 define a hole 33 through which the steering shaft S is to be inserted.

The lock sensor unit 2 includes a lock bar 22. In FIG. 1, a state in which the lock bar 22 protrudes from the curved face 211 is illustrated. In this state, the lock bar 22 is configured to engage with a recess formed in the outer circumferential face of the steering shaft S. When the lock bar 22 engages with the recess, the rotation of the steering shaft S is disabled. The lock bar 22 is configured to be displaceable along a radial direction of the steering shaft S. When the lock bar 22 is retracted to a position where the distal end thereof does not project from the curved face 211, the rotation of the steering shaft S is allowed.

Figure 2:
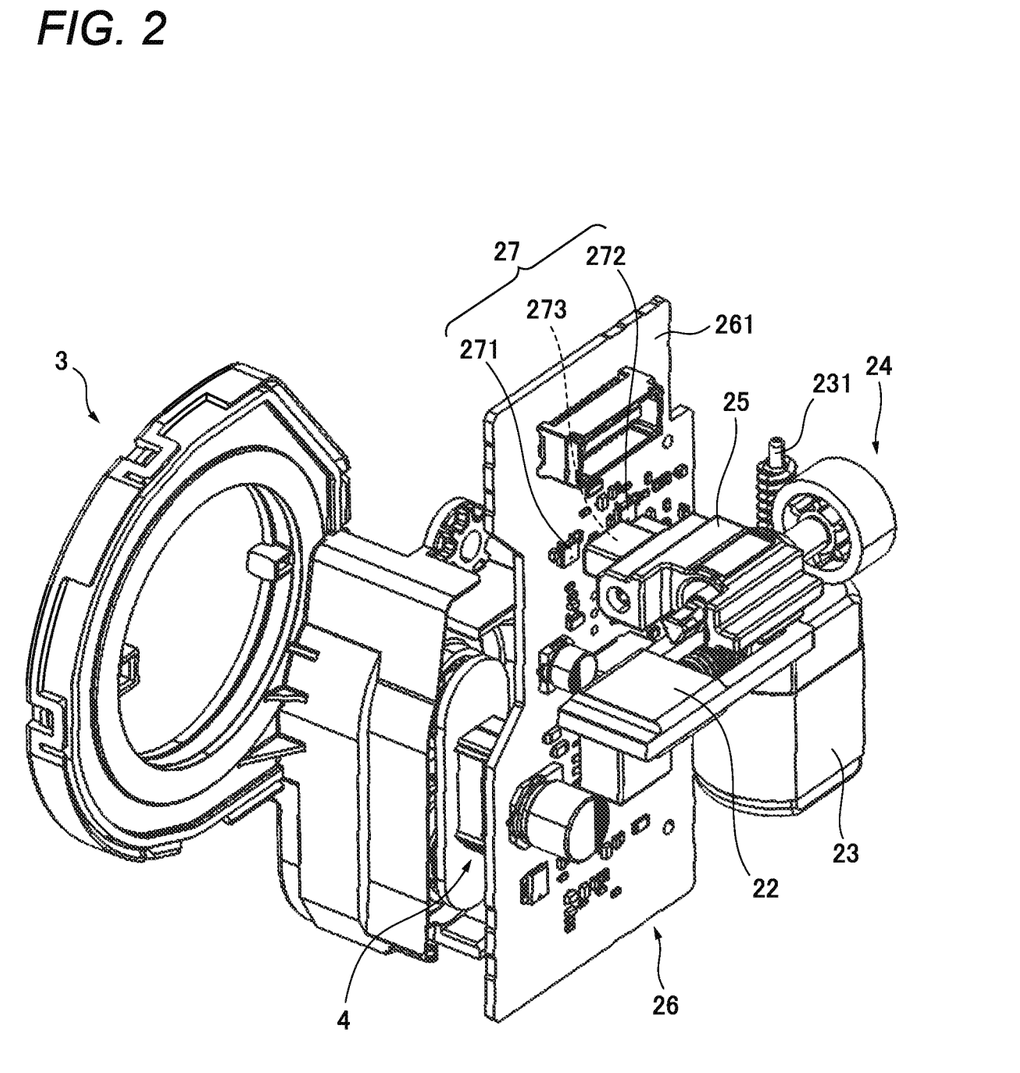
FIG. 2 illustrates an internal configuration of a lock sensor unit in the sensor unit of FIG. 1.

FIG. 2 illustrates a positional relationship between components of the lock sensor unit 2 housed in the housing 21. The lock sensor unit 2 further includes a motor 23, a transmission mechanism 24, a slider 25, a first circuit board 26, and a first sensor 27.

The lock bar 22 is connected to the slider 25. The slider 25 is connected to a shaft 231 of the motor 23 via the transmission mechanism 24. The slider 25 is configured to be displaceable along the radial direction of the steering shaft S. When an external control signal for locking or unlocking the steering shaft S is inputted, the shaft 231 of the motor 23 is rotated. The transmission mechanism 24 converts the rotation of the shaft 231 into a displacement of the slider 25. The lock bar 22, the motor 23, the transmission mechanism 24, and the slider 25 are examples of mechanisms for locking the rotation of the steering shaft S.

When a control signal for locking the steering shaft S is inputted, the motor 23 is driven so that the slider 25 moves closer to the steering shaft S. As a result, the distal end of the lock bar 22 projects from the curved face 211 of the housing 21. The position of the slider 25 at this time will be referred to as a locked position. When a control signal for unlocking the steering shaft S is inputted, the motor 23 is driven so that the slider 25 performs a displacement away from the steering shaft S. As a result, the lock bar 22 is retracted to a position where the distal end thereof does not project from the curved face 211. The position of the slider 25 at this time will be referred to as an unlocked position.

The first sensor 27 detects the position of the slider 25. The first sensor 27 includes a first Hall element 271, a second Hall element 272, and a magnet 273. The first Hall element 271 and the second Hall element 272 are mounted on a first major face 261 of the first circuit board 26. The first circuit board 26 is disposed such that the first major face 261 extends along the displacement direction of the slider 25. The magnet 273 is attached to the slider 25.

Each of the first Hall element 271 and the second Hall element 272 is configured to output a detection signal when the magnetic force of the magnet 273 is detected. The first Hall element 271 is disposed so as to face the magnet 273 when the slider 25 is in the locked position. The second Hall element 272 is disposed so as to face the magnet 273 when the slider 25 is in the unlocked position.

Accordingly, the first sensor 27 outputs a detection signal from either the first Hall element 271 or the second Hall element 272 in accordance with the fact that the slider 25 is located in the locked position or the unlocked position. In other words, the first sensor 27 outputs a signal corresponding to the operation state of the mechanism for locking the rotation of the steering shaft S. The first Hall element 271 and the second Hall element 272 are examples of a signal output part of the first sensor 27.

Figure 3:
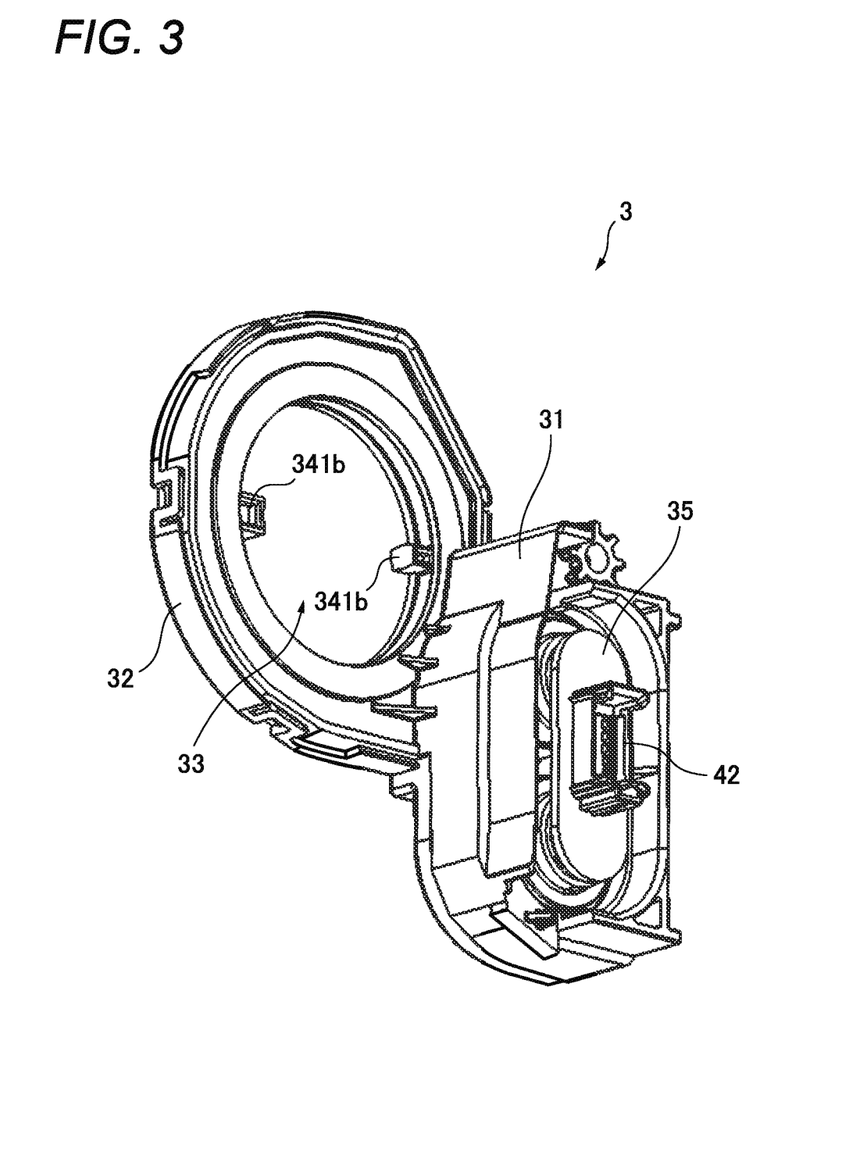
FIG. 3 illustrates an appearance of an angle sensor unit in the sensor unit of FIG. 1.
Figure 4:
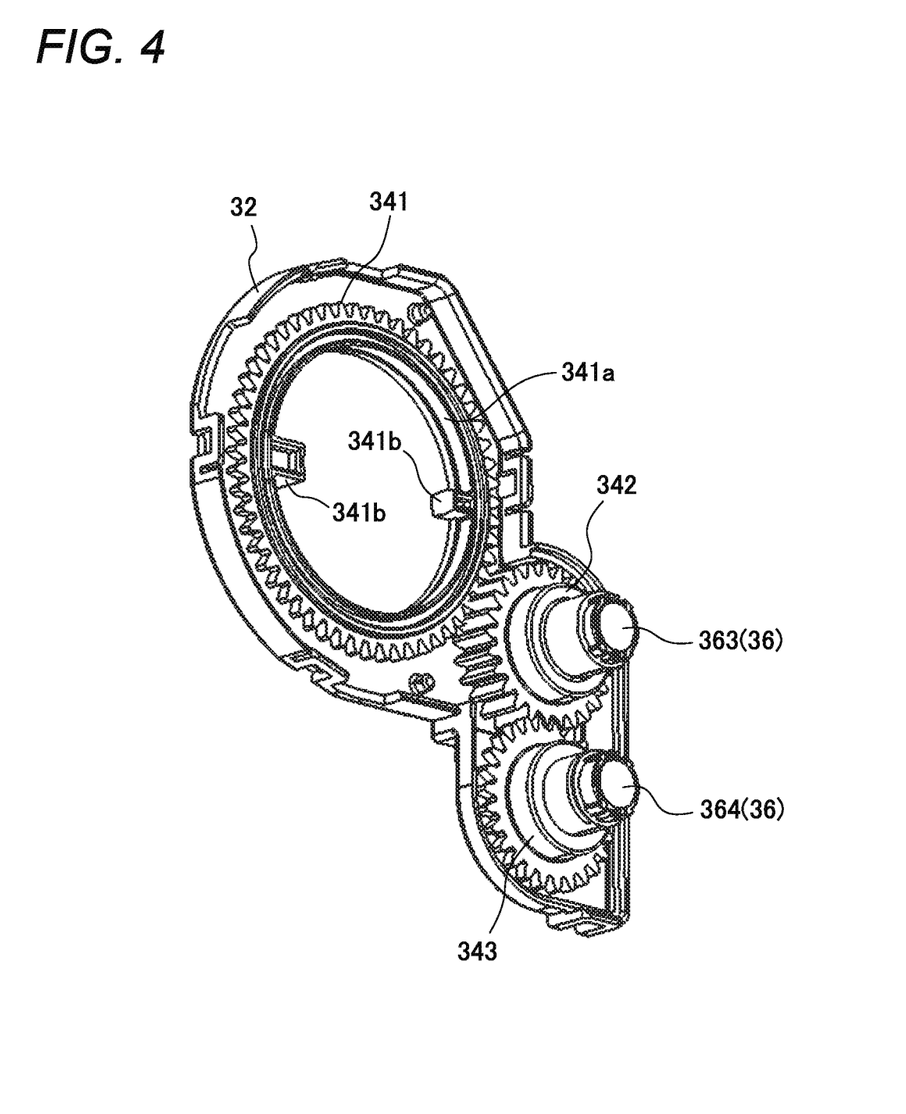
FIG. 4 illustrates an internal configuration of the angle sensor unit of FIG. 3.

FIG. 3 illustrates an appearance of the angle sensor unit 3. FIG. 4 illustrates a positional relationship between components of the angle sensor unit 3 housed in the first housing 31 and the second housing 32.

Figure 5:
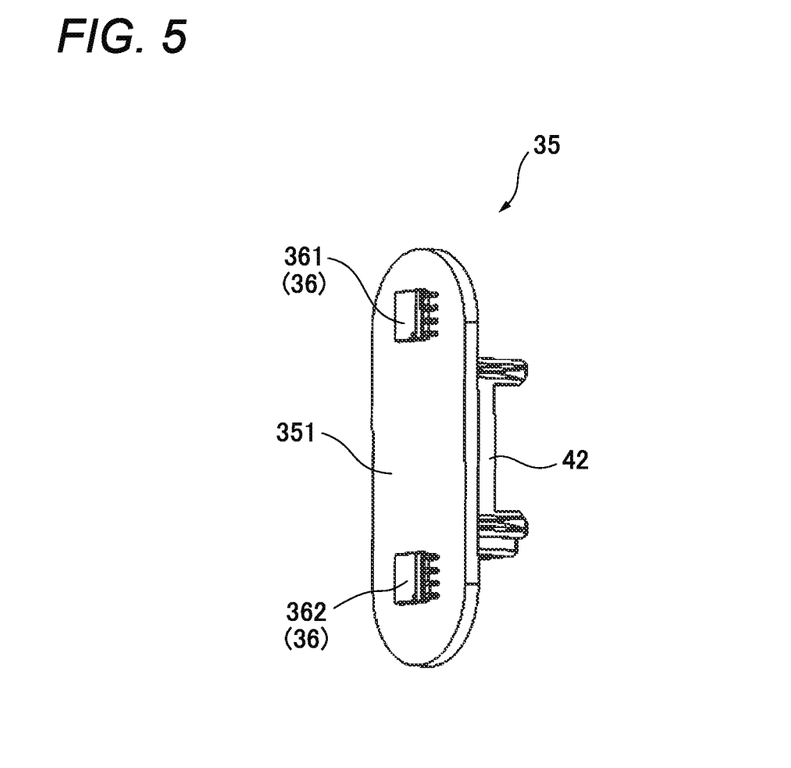
FIG. 5 illustrates an appearance of a second circuit board in the sensor unit of FIG. 1.

The angle sensor unit 3 further includes a first gear 341, a second gear 342, a third gear 343, a second circuit board 35, and a second sensor 36. FIG. 5 illustrates an appearance of the second circuit board 35.

As illustrated in FIG. 4, the first gear 341 has an annular shape extending along an edge of a hole 33. An inner circumferential face 341*a* of the first gear 341 is provided with an engagement member 341*b*. The engagement member 341*b* is configured to engage with the outer circumferential face of the steering shaft S. Accordingly, when the steering shaft S is rotated, the first gear 341 is also rotated.

The first gear 341 meshes with the second gear 342. The second gear 342 meshes with the third gear 343. Accordingly, when the first gear 341 rotates, the second gear 342 and the third gear 343 also rotate. The first gear 341, the second gear 342, and the third gear 343 are an example of a mechanism for detecting the rotation angle of the steering shaft.

The second sensor 36 detects the rotation angle of the steering shaft S. The second sensor 36 includes a first Hall element 361, a second Hall element 362, a first magnet 363, and a second magnet 364.

As illustrated in FIG. 4, the first magnet 363 is attached to the second gear 342. The second magnet 364 is attached to the third gear 343. As illustrated in FIG. 5, the first Hall element 361 and the second Hall element 362 are mounted on a first major face 351 of the second circuit board 35. In the state illustrated in FIG. 3, the second circuit board 35 is disposed such that the first Hall element 361 faces the first magnet 363, and the second Hall element 362 faces the second magnet 364.

The first Hall element 361 outputs a detection signal whose intensity cyclically changes in accordance with the direction of the magnetic pole of the first magnet 363 that changes with the rotation of the second gear 342. The second Hall element 362 outputs a detection signal whose intensity cyclically changes in accordance with the direction of the magnetic pole of the second magnet 364 that changes with the rotation of the third gear 343. The direction of the magnetic pole of the first magnet 363 and the direction of the magnetic pole of the second magnet 364 are determined so that the phase of the detection signal outputted from the first Hall element 361 and the phase of the detection signal outputted from the second Hall element 362 are different from each other.

Accordingly, the intensity of the detection signal outputted from the first Hall element 361 and the intensity of the detection signal outputted from the second Hall element 362 are changed in accordance with the rotation angle of the first gear 341 engaged with the steering shaft S. In other words, the second sensor 36 outputs a signal corresponding to the operation state of the mechanism for detecting the rotation of the steering shaft S. The first Hall element 361 and the second Hall element 362 are examples of a signal output part of the second sensor 36.

Figure 6:
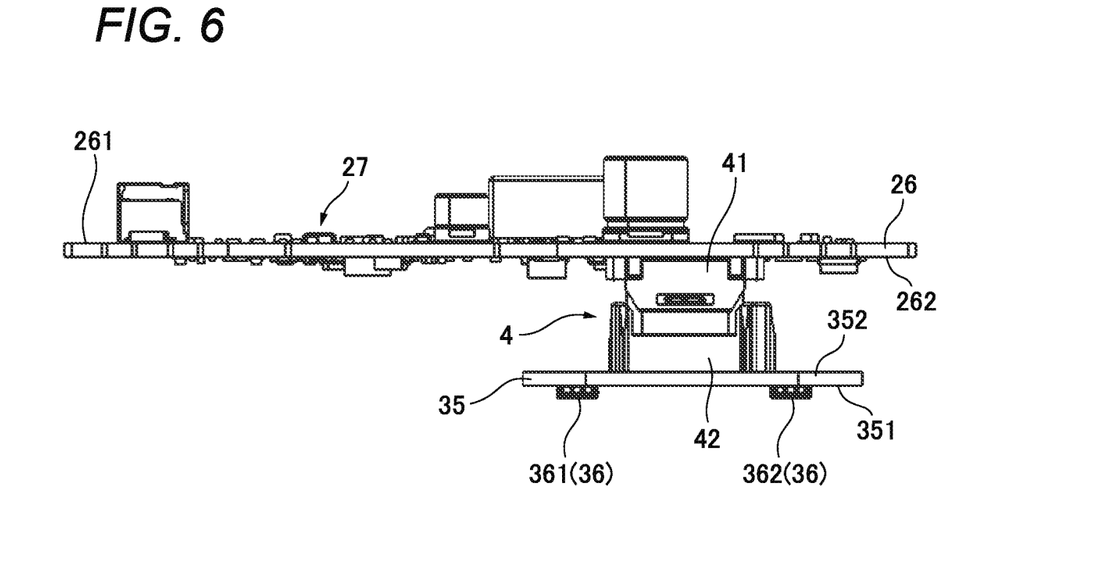
FIG. 6 illustrates a connected state of a first circuit board and the second circuit board in the sensor unit of FIG. 1.

As illustrated in FIG. 2, the sensor unit 1 includes a connector 4. FIG. 6 illustrates an example of the configuration of the connector 4. The connector 4 electrically connects the first circuit board 26 and the second circuit board 35 while allowing the relative displacement therebetween. That is, the first circuit board 26 and the second circuit board 35 share a part of the electrical configuration of the sensor unit 1.

More specifically, the connector 4 includes a first connector portion 41 and a second connector portion 42. The first connector portion 41 is mounted on a second major face 262 of the first circuit board 26. The second connector portion 42 is mounted on a second major face 352 of the second circuit board 35. The first connector portion 41 and the second connector portion 42 are configured to be directly fitted with each other. In the present embodiment, the first connector portion 41 has a so-called floating connector structure, so that the relative displacement between the first circuit board 26 and the second circuit board 35 is allowed.

Figure 7:
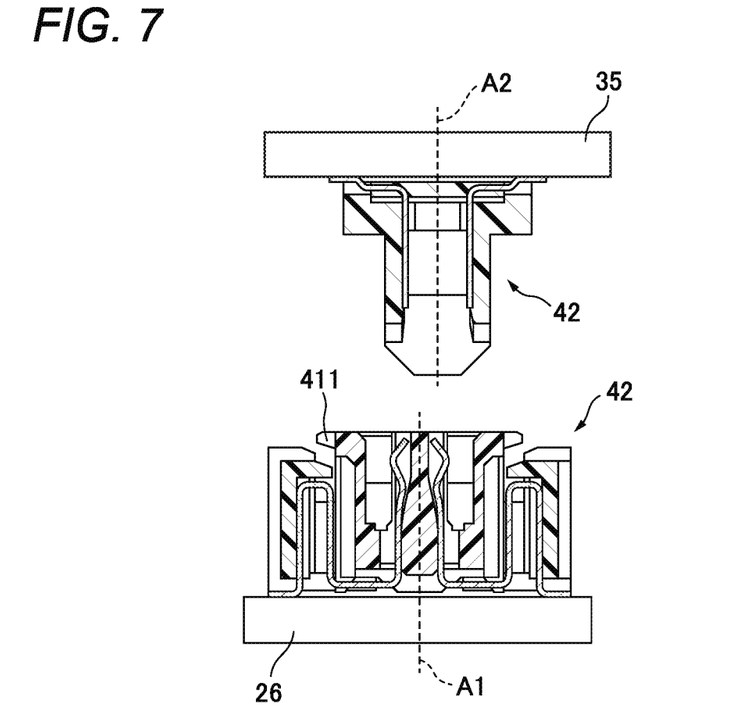
FIG. 7 is an illustration for explaining an operation principle of a floating connector structure.

As illustrated in FIG. 7, the first connector portion 41 has a first fitting axis A1, and the second connector portion 42 has a second fitting axis A2. The fitting direction of the first connector portion 41 and the second connector portion 42 is along a direction in which the first fitting axis A1 and the second fitting axis A2 extend. However, as illustrated in the same figure, the first fitting axis A1 of the first connector portion 41 and the second fitting axis A2 of the second connector portion 42 may be displaced in a direction intersecting with the fitting direction.

Figure 8:
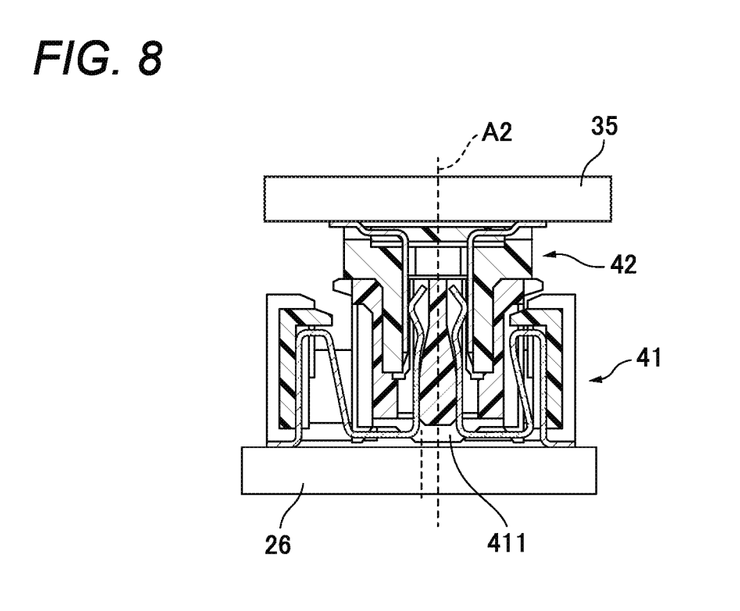
FIG. 8 is an illustration for explaining the operation principle of the floating connector structure.

The first connector portion 41 according to the present embodiment includes a movable portion 411 that is displaceable in a direction intersecting with the fitting direction with respect to the second connector portion 42. When the movable portion 411 is displaced, as illustrated in FIG. 8, even if the first fitting axis A1 and the second fitting axis A2 are displaced in the direction intersecting the fitting direction, direct fitting between the first connector portion 41 and the second connector portion 42 can be achieved.

As described above, there is a demand to arrange the first sensor 27 for detecting the operation state of the mechanism for locking the rotation of the steering shaft S and the second sensor 36 for detecting the operation state of the mechanism for detecting the rotation angle of the steering shaft S as close as possible. As one of measures for meeting such a demand, it is conceivable that the first Hall element 361 as well as the second Hall element 362 are mounted on the first circuit board 26. However, since the position of the first circuit board 26 is determined based on the positional relationship between the mechanism for locking the rotation of the steering shaft S and the first sensor 27, there may be a case where the positional relationship between the mechanism for detecting the rotation of the steering shaft S and the second sensor 36 cannot be optimized. In other words, the detection accuracy of the second sensor 36 may be degraded.

According to the configuration as described above, the arrangement of the first circuit board 26 is determined so as to optimize the positional relationship between the mechanism for locking the rotation of the steering shaft S and the first sensor 27. On the other hand, the arrangement of the second circuit board 35 may be determined independently of the first circuit board 26 so as to optimize the positional relationship between the mechanism for detecting the rotation of the steering shaft S and the second sensor 36. When the positions of the first circuit board 26 and the second circuit board 35 are individually determined, the positional relationship therebetween may be different from each other for each sensor unit 1. However, the difference is absorbed by the connector 4 electrically connecting the first circuit board 26 and the second circuit board 35 while allowing the relative displacement therebetween. Accordingly, while suppressing degradation in the detection accuracy of the first sensor 27 and degradation in the detection accuracy of the second sensor 36, it is possible to arrange the first sensor 27 and the second sensor 36 with a short distance to such an extent that the first circuit board 26 and the second circuit board 35 share a part of the electrical configuration of the sensor unit 1 through the connector 4.

As long as the first circuit board 26 and the second circuit board 35 can be electrically connected while allowing the relative displacement therebetween, the first connector portion 41 and the second connector portion 42 may be connected by a flat flexible cable.

However, since the first connector portion 41 has the floating connector structure as in the present embodiment, direct fitting with the second connector portion 42 is enabled, so that the first circuit board 26 and the second circuit board 35 can be made closer to each other.

The floating connector structure may be provided with the second connector portion 42 in place of the first connector portion 41.

As illustrated in FIG. 2, in the present embodiment, a circuit 37 for processing a signal outputted from the second sensor 36 is mounted on the first circuit board 26. That is, the signals outputted from the first Hall element 361 and the second Hall element 362 are sent to a processing circuit on the first circuit board 26 through the connector 4 to be subjected to processing.

According to such a configuration, since the circuit elements to be mounted on the second circuit board 35 can be minimized, it is possible to suppress the enlargement of the angle sensor unit 3. However, the range of the electrical elements shared by the first circuit board 26 and the second circuit board 35 may be appropriately determined.

In the present embodiment, the first sensor 27 is a magnetic sensor. In this case, it is easy to integrate the sensor elements on the first circuit board 26, and it is possible to suppress the enlargement of the lock sensor unit 2. However, as long as the operation state of the mechanism for locking the rotation of the steering shaft S can be detected, an appropriate configuration such as an optical sensor or a mechanical switch may be employed.

In the present embodiment, the second sensor 36 is a magnetic sensor. In this case, it is easy to integrate the sensor elements on the second circuit board 35, and it is possible to suppress the enlargement of the angle sensor unit 3. However, as long as the operation state of the mechanism for detecting the rotation of the steering shaft S can be detected, an appropriate configuration such as an optical sensor or a mechanical switch may be employed.

Figure 9:
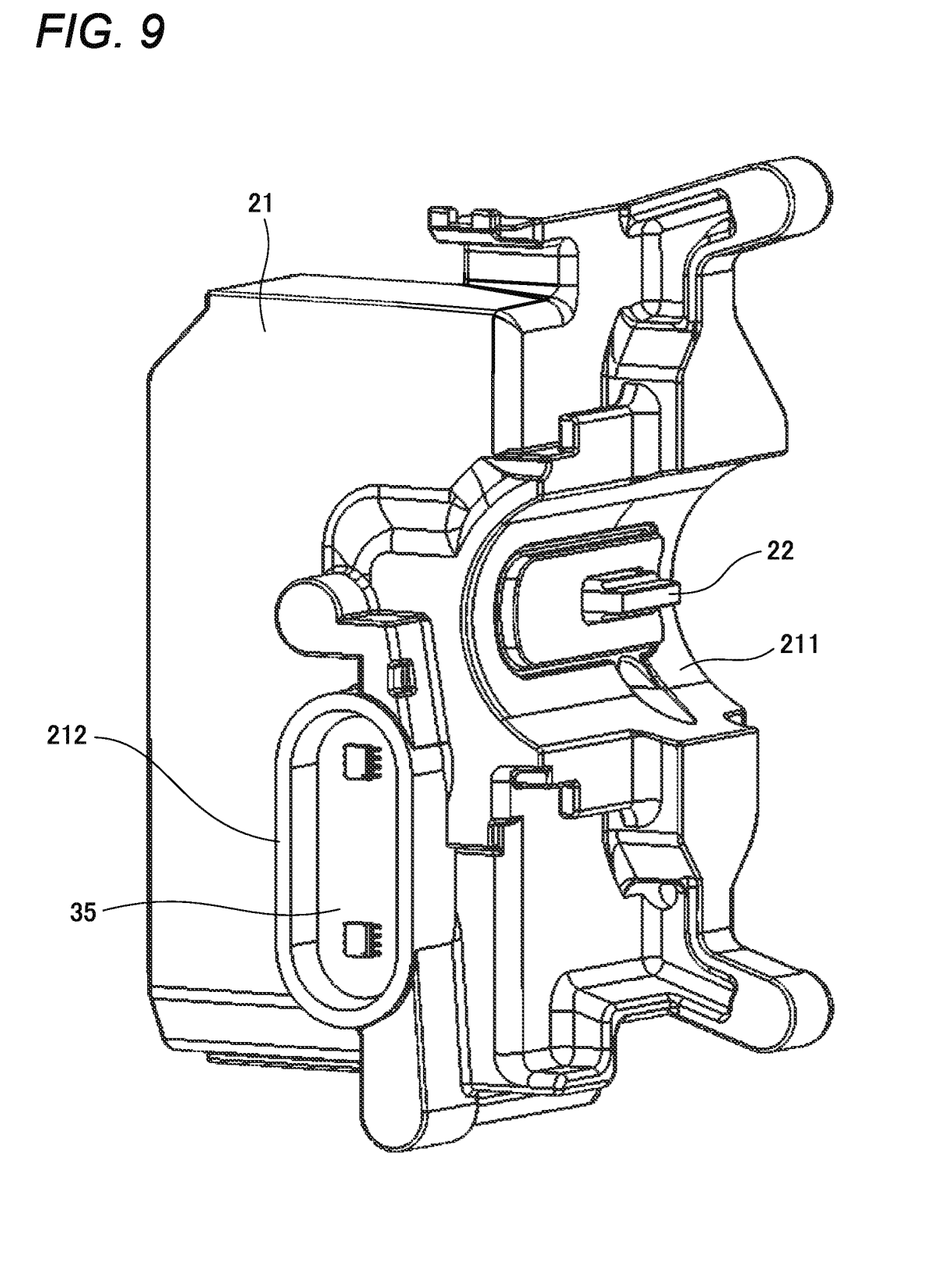
FIG. 9 illustrates an appearance of a housing in the lock sensor unit of FIG. 2.

In the present embodiment, as illustrated in FIG. 9, the housing 21 of the lock sensor unit 2 includes a housing portion 212 for housing the second circuit board 35 of the angle sensor unit 3. In other words, the housing 21 houses the first circuit board 26 and the second circuit board 35.

According to such a configuration, it is possible to suppress the relative displacement between the first circuit board 26 and the second circuit board 35 after being connected by the connector 4. Accordingly, it is possible to further suppress degradation in the detection accuracy of the first sensor 27 and degradation in the detection accuracy of the second sensor 36.

The above embodiments are merely illustrative for facilitating understanding of the presently disclosed subject matter. The configuration according to the above embodiment can be appropriately modified or improved without departing from the gist of the presently disclosed subject matter.

The present application is based on Japanese Patent Application No. 2019-115403 filed on Jun. 21, 2019, the entire contents of which are incorporated herein by reference.

The invention claimed is:

1. A sensor unit configured to be coupled to a steering shaft for use in steering a mobile entity, the sensor unit comprising:
   a first circuit board including a first signal output part of a first sensor, the first signal output part being configured to output a first signal corresponding to a first operation state of a first mechanism for locking rotation of the steering shaft;
   a second circuit board including a second signal output part of a second sensor, the second signal output part being configured to output a second signal corresponding to a second operation state of a second mechanism for detecting a rotation angle of the steering shaft; and a connector electrically connecting the first circuit board and the second circuit board while allowing relative displacement therebetween.

2. The sensor unit according to claim 1, wherein the connector includes:
- a first connector portion mounted on the first circuit board; and
- a second connector portion mounted on the second circuit board, and wherein one of the first connector portion and the second connector portion includes a movable portion that is displaceable in a direction intersecting with a direction that the one of the first connector portion and the second connector portion is fitted with an other of the first connector portion and the second connector portion.

3. The sensor unit according to claim 1, wherein a circuit for processing a signal outputted from the second sensor is mounted on the first circuit board.

4. The sensor unit according to claim 1, wherein at least one of the first sensor and the second sensor is a magnetic sensor.

5. The sensor unit according to claim 1, further comprising:
- a housing configured to commonly house the first circuit board and the second circuit board.

6. The sensor unit according to claim 2, wherein the first connector portion includes a floating connector structure.

7. The sensor unit according to claim 1, wherein the connector includes:
- a first connector portion mounted on the first circuit board; and
- a second connector portion mounted on the second circuit board, and the first connector portion includes a floating connector structure for allowing the relative displacement between the first circuit board and the second circuit board.

8. The sensor unit according to claim 1, wherein the connector includes:
- a first connector portion mounted on the first circuit board, the first connector portion having a first fitting axis; and
- a second connector portion mounted on the second circuit board, the second connector portion including a second fitting axis, a fitting direction of the first connector portion and the second connector portion is along a direction in which the first fitting axis and the second fitting axis extend.

9. The sensor unit according to claim 8, wherein the first connector portion includes a movable portion that is displaceable in a direction intersecting with the fitting direction with respect to the second connector portion.

10. The sensor unit according to claim 1, wherein the connector includes:
- a first connector portion mounted on the first circuit board, the first connector portion having a first fitting axis; and
- a second connector portion mounted on the second circuit board, the second connector portion including a second fitting axis, the first fitting axis and the second fitting axis are displaceable in a direction intersecting with a fitting direction.

* * * * *